United States Patent [19]

Kikuchi et al.

[11] Patent Number: 5,056,916
[45] Date of Patent: Oct. 15, 1991

[54] OPTICAL AXIS ADJUSTING SYSTEM FOR LIGHTING UNIT OF VEHICLE

[75] Inventors: Yoichi Kikuchi, Yokohama; Miyoshi Iwamoto, Odawara, both of Japan

[73] Assignee: Nissan Motor Co., Ltd., Yokohama, Japan

[21] Appl. No.: 586,648

[22] Filed: Sep. 24, 1990

[30] Foreign Application Priority Data

Sep. 25, 1989 [JP] Japan .................. 1-249868

[51] Int. Cl.$^5$ .............................. G01J 1/00
[52] U.S. Cl. ................... 356/121; 356/122; 33/288
[58] Field of Search ............... 356/121, 122, 123, 146, 356/150, 153, 124, 127; 33/286, 288; 362/61, 71, 372

[56] References Cited

U.S. PATENT DOCUMENTS

| | | | |
|---|---|---|---|
| 1,991,928 | 2/1935 | Hill | 356/122 |
| 3,542,475 | 11/1970 | Cooper | 356/124 |
| 4,009,966 | 3/1977 | Craig | 356/122 |
| 4,628,414 | 12/1986 | Ricard | 35/288 |

Primary Examiner—Richard A. Rosenberger
Assistant Examiner—Hoa Pham
Attorney, Agent, or Firm—Lowe, Price, LeBlanc & Becker

[57] ABSTRACT

An optical axis adjusting system comprises at least one lighting unit such as a vehicle's head lamp unit, and at least one optical instrument. The lighting unit comprises a housing having a reflector, and a lens having first and second portions which are positioned so that the first and second portions intersect, respectively, imaginery first and second straight lines that are parallel to the optical axis of the lighting unit and symmetrical with respect to the optical axis. The optical instrument has a light projecting unit for projecting a light beam such as a laser beam to the reflector through the first portion of the lens, and a light receiving unit for receiving a reflected beam reflected from the reflector and transmitted through the second portion of the lens. The lighting unit has at least one adjusting screw by which the aim of the lighting unit is adjusted so that reflected beam is correctly received by the receiving unit.

11 Claims, 2 Drawing Sheets

OPTICAL AXIS ADJUSTING SYSTEM FOR LIGHTING UNIT OF VEHICLE

BACKGROUND OF THE INVENTION

The present invention relates to systems for adjusting optical axes of lighting units such as head lamps of motor vehicles.

One conventional aim adjusting method requires light beams of head lamps. Therefore, the aim adjustment must be performed in a vehicle assembly line after electrical circuits for head lamps are completed.

SUMMARY OF THE INVENTION

It is an object of the present invention to provide an aim adjusting system which can accurately adjust the optical axis of a lighting unit without turning on the lighting unit.

According to the present invention, an optical axis adjusting system comprises a lighting unit and an optical means (optical instrument). The lighting unit such as a head lamp comprises a housing having a reflector therein, and a lens attached to the housing so as to close an opening of the housing. The lens comprises first and second portions which are located so that the first and second portions intersect, respectively, first and second straight lines that are parallel to an optical axis of the lighting unit, and symmetrical with respect to the optical axis. The optical means projects a beam of light to the reflector through the first portion of the lens, and receives a reflected beam of light through the second portion to determine whether the lighting unit is placed in a predetermined correct position. The optical means may comprise a light projecting unit, and a light receiving unit.

DETAILED DESCRIPTION OF THE INVENTION

Figure 1:
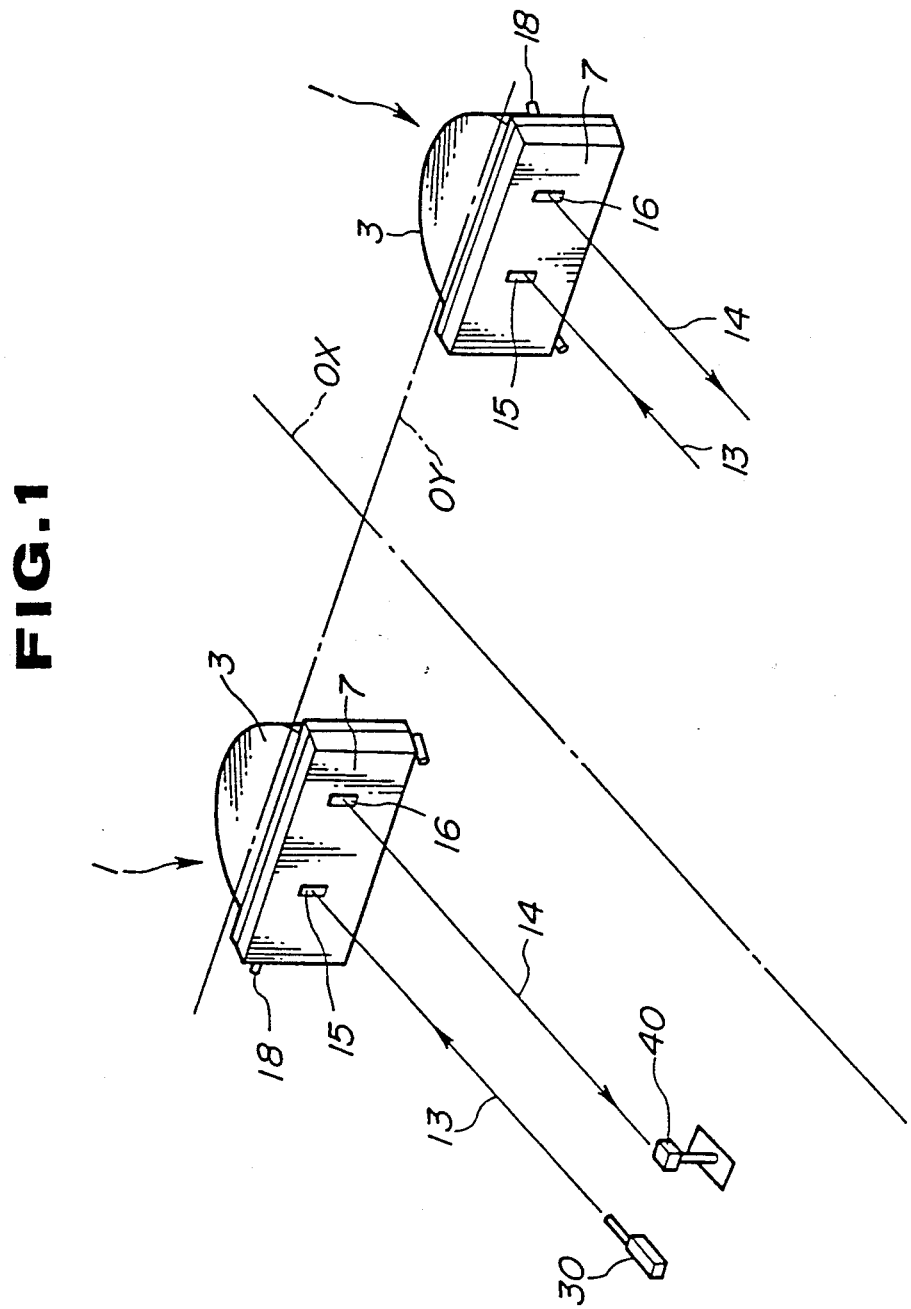
FIG. 1 is a schematic view showing an optical axis adjusting system according to one embodiment of the present invention.

FIG. 1 shows an optical axis adjusting system 1 according to one embodiment of the present invention. The adjusting system of this embodiment comprises at least one lighting unit 17, and at least one optical instrument (means) including a light projecting unit 30 and a light receiving unit 40. The lighting unit 17 of this embodiment is a head lamp unit mounted on a vehicle body structure 50.

The head lamp unit 17 includes a housing 3 having a reflector 2 therein, and a lens 7 fixed to the housing 3 to close an opening 4 of the housing 3. The lens 7 has a smooth outside surface. The entirety of the outside surface of the lens 7 is smooth. A main portion of the lens 7 has an inside surface 6 which functions as prisms. The inside surface of the main portion is formed with a predetermined pattern, so that the inside surface 6 of the main portion is not smooth but rugged. The housing 3 has a portion for supporting a light source such as a bulb 8 so that the light source is placed at a focus which lies on an optical axis 9 of the refelector 2. The reflector 2 has a reflecting surface. For example, the reflecting surface is parabolic so that the reflecting surface forms reflected light rays parallel to the optical axis by reflecting light rays emitted from the focus. The head lamp unit 17 further includes a manual adjusting device 18.

Figure 2:
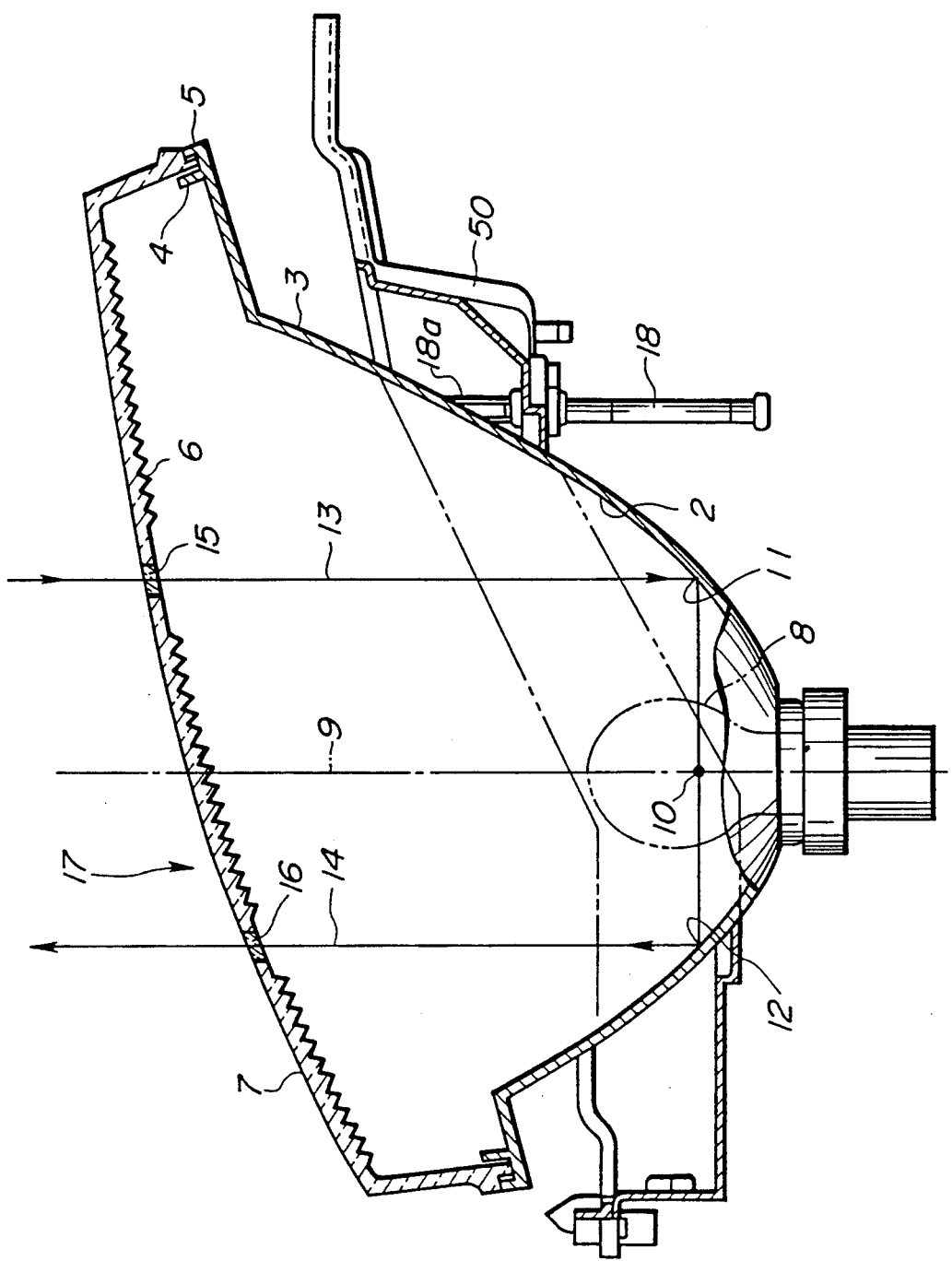
FIG. 2 is a sectional view of a lighting unit shown in FIG. 1.

The lens 7 has first and second portions 15 and 16. The first portion 15 is so located that an imaginary first straight line 13 intersects the first portion 15. The second portion 16 is so located that an imaginary second straight line 14 intersects the second portion 16. As shown in FIG. 2, the first and second straight lines 13 and 14 are parallel to the optical axis 9 of the head lamp unit 17, and symmetrical with respect to the oprical axis 9. The first and second straight lines 13 and 14 and the optical axis 9 are coplanar, and the distance between the first straight line 13 and the optical axis 9 is equal to the distance between the second straight line 14 and the optical axis 9. In this embodiment, the first and second straight lines 13 and 14 lie in a plane which is substantially horizontal and substantially perpendicular to the vertical axis (z axis) of the vehicle. The first straight line 13 intersects the reflecting surface of the reflector 2 at a first point 11 of reflection. The second straight line 14 intersects the reflecting surface of the reflector 2 at a second point 12 of relection. The first and second points of reflection 11 and 12 are symmetrical with respect to the focus 10. Therefore, an incident light ray moving in the first straight line 13 is reflected at the first reflection point 11 of the reflector 2 in such a manner that a reflected ray is perpendicular to the incident ray. The reflected ray passes through the focus 10 and strikes on the second reflection point 12 of the reflector 2. Therefore, the reflected ray is further reflected at the second reflection point, so that there arises an emergent ray which is coincident with the second straight line and which is perpendicular to a third straight line passing through the focus 10 and the first and second reflection points 11 and 12.

The inside surface of each of the first and second portions 15 and 16 of the lens 7 is smooth, and surrounded by the rugged inside surface 6 of the main portion of the lens. The first and second portions 15 and 16 are so shaped as not to diffuse light. In this embodiment, the first portion 15 is so shaped as to allow an incident light ray having the direction coincident with the first straight line 13 to pass therethrough without changing the direction of the light ray. Similarly, the second portion 16 is so shaped as to allow an emergent ray in the second straight line 14 to pass therethrough without changing the direction of the ray. In each of the first and second portions 15 and 16, the inside and outside surfaces are parallel to each other, and the thickness is uniform. It is possible to form each of the first and second portions 15 and 16 by fitting a small piece in a small opening formed in the lens 7. Each of the first and second portions 15 and 16 may be made of material which is different from that of the surrounding portion of the lens 7.

The adjusting device 18 comprises an externally threaded adjusting screw 18 engaged with an internally threaded hole of the vehicle body 50. The adjusting device 18 is arranged to adjust the aim of the head lump unit 17 with respect to a straight line OX parallel to the longitudinal axis of the vehicle, and a straight line OY parallel to the lateral axis of the vehicle.

The light projecting unit 30 of this embodiment has a device for emitting a laser beam. The light projecting unit 30 is positioned to project an incident light ray at the first portion 15 of the lens 7 of the head lump unit 17 mounted on the vehicle body structure 50 which is held at a predetermined test position. The light receiving unit 40 is positioned so that the receiving unit 40 can receive an emergent light ray which is a reflected ray resulting from two reflections of the incident ray only when the head lamp unit 17 is placed in a correct position relative to the vehicle body structure 50. In this embodiment, the distance between the light projecting and receiving units 30 and 40 is equal to the distance between the centers of the first and second portions 15 and 16 of the lens 7. The light projecting and receiving units 30 and 40 are provided in a structure of a vehicle assembly line. The structure of the vehicle assembly line has a means for holding a vehicle body structure in the predetermined test position, and a means for holding the light projecting and receiving units 30 and 40 in the predetermined positions relative to the test position.

In the aim adjusting method according to the present invention, the position and angle of a lighting unit is adjusted until the receiving unit 40 correctly receives a reflected laser beam. There is no need for turning on the lighting unit 17. Therefore, it is possible to perform the aim adjustment before electrical components are assembled to complete the circuit for the lighting unit.

Each of the first and second portions 15 and 16 of the lens 7 may be so designed that the direction of a light ray is changed when the light ray passes through that portion, and incoming and outgoing light rays form a predetermined angle. However, it is inappropriate to use a light diffusing glass as the first and second portions 15 and 16 of the lens 7.

It is optional to further adjust the lighting unit by using a level or other device for finding a horizontal plane after the optical adjustment of the present invention is finished.

The optical instrument of the present invention may be a portable instrument equipped on a vehicle so that the user of the vehicle can adjust the head lamp units of the vehicle by himself.

What is claimed is:

1. An optical axis adjusting system comprising:
   a lighting unit for a vehicle, said lighting unit comprising a housing having a reflector therein, and a lens attached to said housing so as to close an opening of said housing, said lens comprising first and second portions located so that said first and second portions intersect, respectively, first and second straight lines which are parallel to an optical axis of said lighting unit, and symmetrical with respect to said optical axis; and
   an optical means for projecting a beam of light to said reflector through said first portion of said lens, and receiving a reflected beam of light through said second portion to determine whether said lighting unit is placed in a predetermined correct position.

2. A system according to claim 1 wherein said optical means comprises a light projecting unit for projecting a beam of light to said reflector, and a light receiving unit for receiving a reflected beam of light from said reflector.

3. A system according to claim 2 wherein each of said first and second portions of said lens has a smooth inside surface, and said lens further comprises a third portion having a rugged inside surface.

4. A system according to claim 3 wherein each of said first and second portions of said lens is surrounded by said third portion.

5. A system according to claim 4 wherein said reflector is so shaped that rays of light emitted from a focus lying on said optical axis are reflected in a direction parallel to said optical axis.

6. A system according to claim 2 wherein said light projecting unit comprises a device for producing a laser beam.

7. A system according to claim 2 wherein a distance between said light projecting and receiving units is equal to a distance between said first and second portions of said lens.

8. A system according to claim 2 wherein said lighting unit further comprises an adjusting means for adjusting the position of said lighting unit.

9. A system according to claim 2 wherein said lens comprises a main body formed with first and second openings, a first pieace fitted in said first opening to form said first portion of said lens, and a second piece fitted in said opening to form said second portion of said lens.

10. A system according to claim 1 wherein said optical means comprises a portable optical instrument comprising a light projecting unit for projecting a beam of light to said reflector and a light receiving unit for receiving a reflected beam of light from said reflector.

11. A method for adjusting an optical axis of a vehicular lighting unit comprising a housing having a reflector therein and a lens attached to said housing so as to close an opening of said housing, comprising:
   a first step of projecting a beam of light to said reflector through a predetermined first portion of said lens; and
   a second step of receiving a reflected beam of light through a predetermined second portion of said lens to determine whether said lighting unit is placed in a predetermined correct position, said first and second portions being so located that said first and second portions intersect, respectively, first and second straight lines which are parallel to the optical axis of said light unit and symmetrical with respect to said optical axis.

* * * * *